G. D. PUSHEE.
APPARATUS FOR MAKING BRUSHES.
APPLICATION FILED JULY 12, 1909.

957,255.

Patented May 10, 1910.

3 SHEETS—SHEET 2.

Witnesses:
Mary G. Hennessy
K. A. Dugan

Inventor:
George D. Pushee
by George A. Rockwell
Atty.

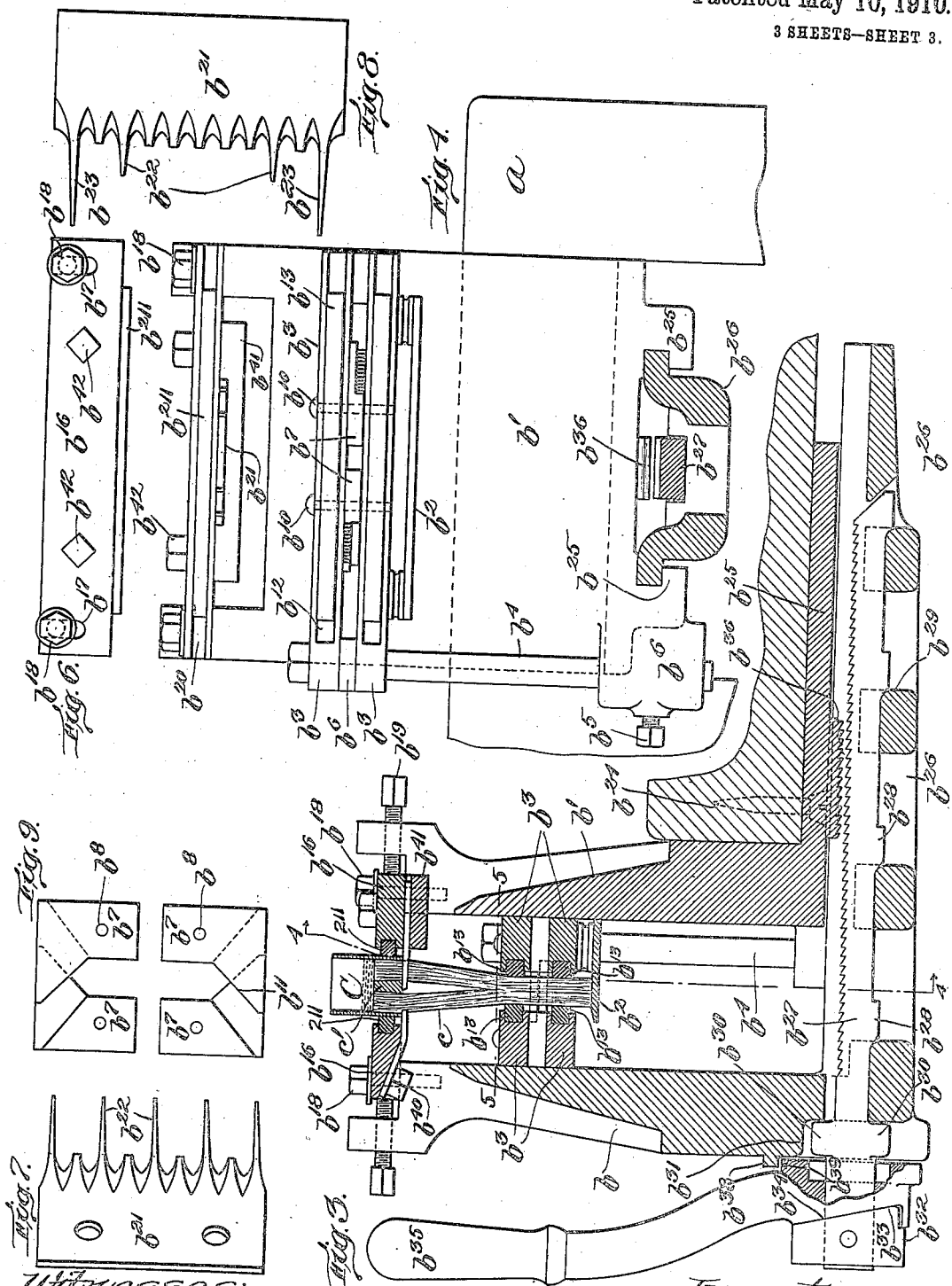

UNITED STATES PATENT OFFICE.

GEORGE D. PUSHEE, OF WESTON, MASSACHUSETTS.

APPARATUS FOR MAKING BRUSHES.

957,255.

Specification of Letters Patent. Patented May 10, 1910.

Application filed July 12, 1909. Serial No. 507,060.

*To all whom it may concern:*

Be it known that I, GEORGE D. PUSHEE, of Weston, in the county of Middlesex and State of Massachusetts, have invented a new and useful Apparatus for Making Brushes, of which the following is a specification.

The object of my invention is to provide a simple apparatus for use in making brushes and particularly for use in applying rubber compound or other cement to the roots of the bristles while the latter are within the ferrule.

My invention comprises means for holding the ferrule and bristles in assembled relation and means for forcing the cement under pressure between the roots of the bristles while the bristles and ferrule are so held.

Other features of my invention will be hereinafter pointed out.

Figure 1:
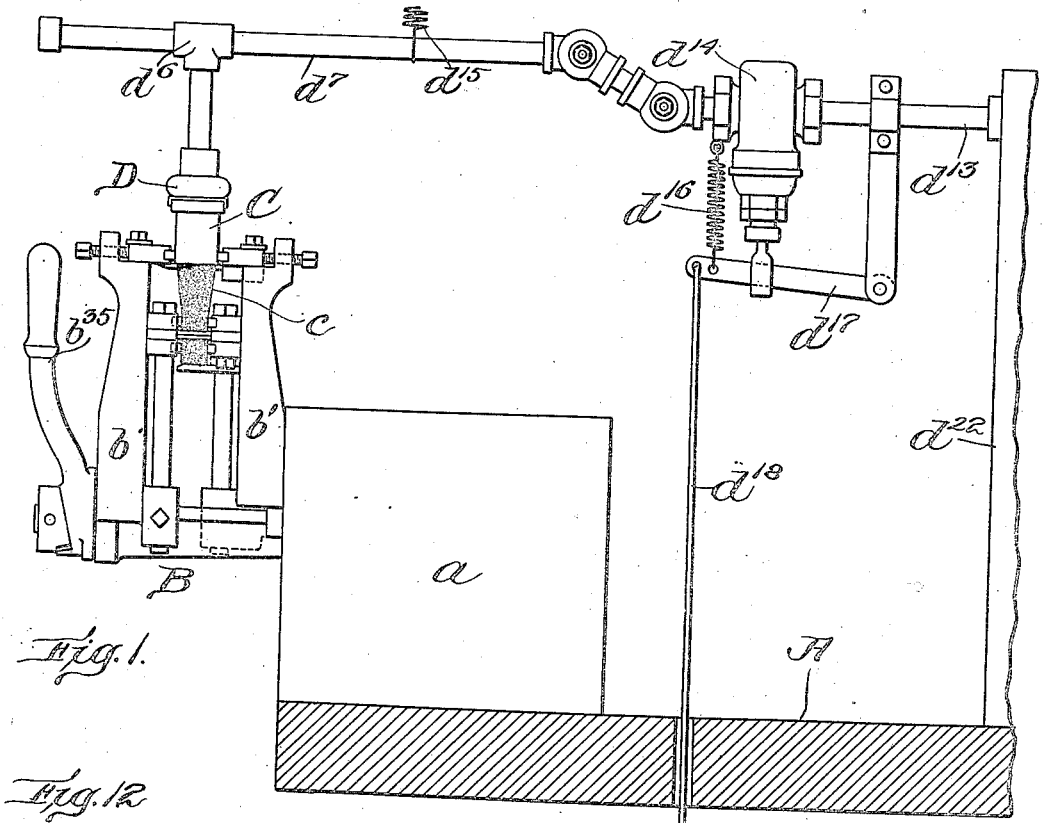
Figures 12, 13:
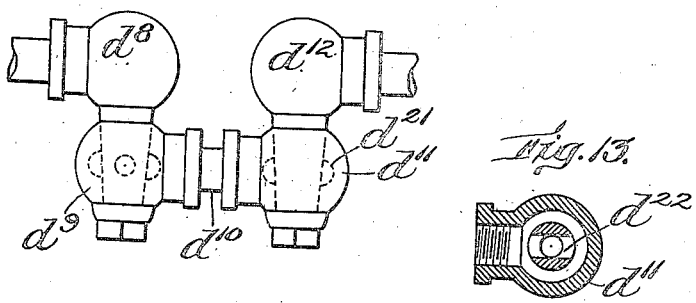
Figure 2:
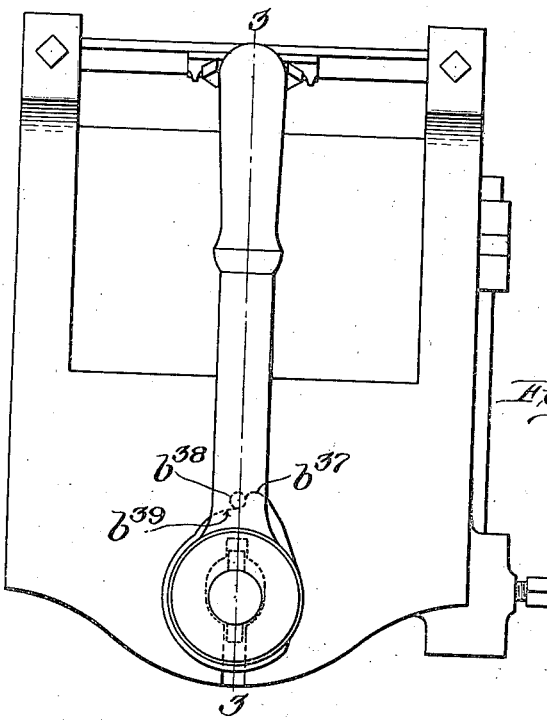
Figure 5:
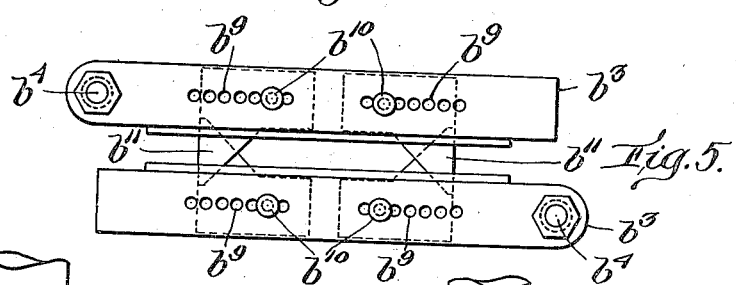
Figure 11:
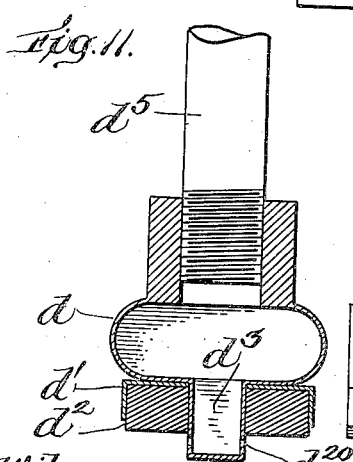
Figure 10:
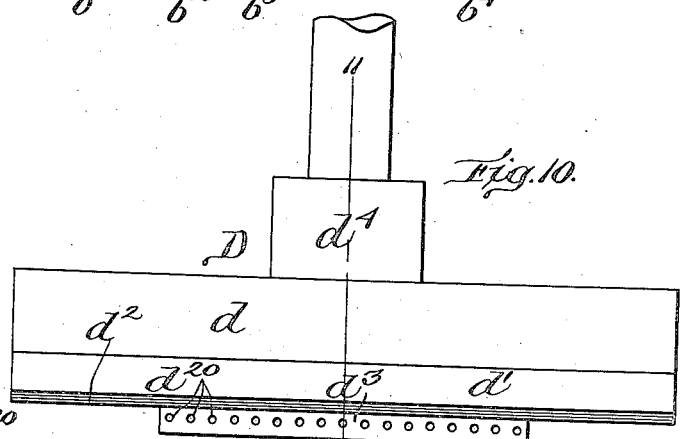

In the drawings Figure 1 is a side elevation of an apparatus embodying one form of my invention; Fig. 2 is a front view of the vise hereinafter described; Fig. 3 is a section on line 3—3 of Fig. 2; Fig. 4 is a section on line 4—4 of Fig. 3; Fig. 5 is a section on line 5—5 of Fig. 3; Fig. 6 is a plan view of one of the ferrule-clamping bars; Figs. 7 and 8 are details of the plug and ferrule supports hereinafter described; Fig. 9 is a detail of the bristle-embracing members; Fig. 10 is an elevation of the pressure nozzle; Fig. 11 is a section on line 11—11 of Fig. 10, showing also a part of the brush and its supports; and Figs. 12 and 13 are details of the pressure applying apparatus hereinafter described.

A represents a bench made with an upright $a$ to which is fixed the brush-holding vise B. A brush ferrule C with the roots of the bristles $c$ assembled within it is clamped between the two jaws $b$ $b'$ of vise B, with a suitable quantity of liquid cement deposited within the ferrule on top of the roots of the bristles. A nozzle D is then applied to the top of the ferrule and air under pressure is discharged from the nozzle into the interior of the ferrule forcing the cement down around and between the roots of the bristles. The nozzle D is then removed from the ferrule and the latter with the bristles cemented within it is removed from the vise.

The class of brush for which this apparatus is especially intended is that which is made with a central plug $c'$ (see Fig. 3) and in order to prevent this plug and also the bristles from being blown or forced downwardly out of the ferrule when the pressure is applied I have provided means for holding the bristles, plug and ferrule in their proper relation while the air under pressure is being applied.

In order to hold and support the bristles the jaw $b'$ is made with a shelf $b^2$ upon which the lower ends of the bristles rest, and a pair of bars $b^3$ $b^3$ coöperating with a similar pair of bars $b^3$ $b^3$ on the jaw $b$ of the vise clamp the bunch of bristles between them and hold it in position over shelf $b^2$. The bars $b^3$ of each pair project rigidly from a post $b^4$ and each post $b^4$ is fastened by means of a screw $b^5$ within a socket $b^6$ so that it can be adjusted vertically. The shelf $b^2$ is fixed to the under side of the lower bar $b^3$ on the jaw $b'$. The two bars $b^3$ $b^3$ of each pair are separated by a washer $b^6$ on the post $b^4$ so as to leave a space between them to receive a pair of plates $b^7$ $b^7$ (Fig. 8) each made with perforations $b^8$ $b^8$. The bars $b^3$ $b^3$ are each made with perforations $b^9$ $b^9$ and the plates $b^7$ $b^7$ are fastened in place between bars $b^3$ $b^3$ by means of pins $b^{10}$ $b^{10}$ which extend through the perforations $b^8$ and $b^9$. Each bar $b^3$ is made with a plurality of perforations $b^9$ so that the plates $b^7$ may be adjusted toward or from each other according to the size of the brush. The plates $b^7$ are made with beveled extensions $b^{11}$ and when the two jaws $b$ $b'$ of the vise are brought together against the bunch of bristles the beveled extensions $b^{11}$ gather and bunch the bristles between them while the bars $b^3$ clamp against the sides of the bunch. The inner face of each bar is made with a groove $b^{12}$ holding a bristle-engaging strip $b^{13}$ of rubber or other suitable yielding material. The bars $b^3$ $b^3$ with their strips $b^{13}$ $b^{13}$ constitute the bristle-engaging portions of the two jaws of the vise and each pair of said bars is connected with its jaw by the post $b^4$ and set screw $b^5$ so that it can be adjusted vertically along the face of its jaw to adapt the vise to brushes of different lengths. Also by loosening the set screw $b^5$ either pair of bars $b^3$ may be swung away from its jaw when transferring the pins $b^{10}$ $b^{10}$ and plates $b^7$ said pair being returned to position against its jaw and fixed there by tightening screw $b^5$ after this adjustment is made. At the top of each jaw $b$ $b'$ is a bar $b^{16}$ made near its ends with slots $b^{17}$ through which extend screws $b^{18}$ by means of which the bar is fastened to the top of its jaw. Adjusting screws $b^{19}$ mounted in the jaws bear against the outer edges of the bars $b^{16}$ and together with the screws $b^{18}$ serve to hold the bars in position with provision for adjustment toward and from each other. Each bar $b^{16}$ is made along its inner edge with a groove $b^{20}$ holding a strip $b^{211}$ of rubber or other yielding material. When the vise is set the two bars $b^{16}$ clamp the ferrule C between them and hold it against lateral displacement. To the under side of each bar $b^{16}$ is fixed a plate $b^{21}$ made with fingers $b^{22}$ which when the vise is set occupy positions immediately below the lower end of the ferrule C and support the latter against the downward pressure exerted upon said ferrule by the application of the nozzle to the upper end thereof. One of the plates $b^{21}$ is made with a pair of fingers $b^{23}$ which are longer than the fingers $b^{22}$ so that when the ferrule C with its bristles $c$ is placed in position these fingers $b^{23}$ penetrate the bunch of bristles and occupy positions immediately below the plug $c'$ so as to support the latter against displacement downward when the air under pressure is admitted to the upper end of the ferrule. These fingers $b^{23}$ are made in the form of thin blades so as to cause no material displacement laterally of the bristles.

The plate $b^{21}$ on jaw $b$ is fastened to its bar $b^{16}$ by screws $b^{40}$ while the plate $b^{21}$ on the jaw $b'$ is clamped to its bar $b^{16}$ by a plate $b^{41}$ fastened by screws $b^{42}$ to said bar. The jaw $b'$ of the vise is rigidly fixed by screws one of which is indicated at $b^{24}$ to the upright $a$ and is made with ways $b^{25}$ within which is slidably mounted an extension $b^{26}$ with which the front jaw $b$ is provided. The extension $b^{26}$ carries a toothed bar $b^{27}$ which is movable endwise and vertically relatively to the jaw $b$ and its extension $b^{26}$, said bar being made with cams $b^{28}$ coöperating with cross-bars $b^{29}$ on the extension $b^{26}$. The toothed bar $b^{27}$ is made with wings $b^{30}$ which by engagement with the walls of a socket $b^{31}$ formed in the outer face of jaw $b$ prevent rotation of said bar. The bar $b^{27}$ has fixed to its outer end a collar $b^{32}$ made with cams $b^{33}$ coöperating with cam surfaces $b^{34}$ provided at the outer end of a hub of lever $b^{35}$ said hub being loosely mounted on the bar $b^{27}$ between the collar $b^{32}$ and the jaw $b$. It will thus be seen that when the lever $b^{25}$ is swung to the right in Fig. 2 the cam surfaces $b^{34}$ act through the collar $b^{32}$ to force the bar $b^{27}$ to the left in Fig. 3 causing the cams $b^{28}$ to ride up on the cross-bars $b^{29}$ thus lifting the bar $b^{27}$ into locked relation with a rack $b^{36}$ which forms part of the jaw $b'$. That is, this movement of the lever $b^{35}$ not only lifts the bar $b^{27}$ into engagement with the rack $b^{26}$ so as to lock the two jaws against opening but at the same time the rotary movement of the hub of lever $b^{35}$ causes the jaw $b$ to be advanced toward the jaw $b'$ so as to firmly clamp the brush between them. To release the brush the lever $b^{35}$ is thrown back to the position shown in the drawings with a lug $b^{37}$ on the hub of said lever in contact with a pin $b^{38}$ projecting from the face of jaw $b$. When the lever is in this position the jaw $b$ is free to be shifted toward and from the jaw $b'$ and since it is most convenient to use the lever $b^{35}$ for thus shifting the jaw the hub of said lever is made with a cam-like projection $b^{39}$ which occupies a position immediately below the pin $b^{38}$ when lug $b^{37}$ is against said pin thereby locking the toothed bar $b^{27}$ down so that when the operator pulls upon the lever $b^{35}$ to open the vise said bar is not lifted into engagement with the rack $b^{36}$ said engagement being effected only by the swinging movement of the lever $b^{35}$ above described.

The nozzle D comprises a hollow head $d$ to the lower side of which is fixed a trough-like strip of metal $d'$ holding a block of rubber or the like $d^2$ which surrounds a hollow extension $d^3$ projecting from the head $d$. The head $d$ is made with an interiorly-threaded boss $d^4$ into which is screwed one end of a pipe $d^5$, the other end of the latter being connected by a T $d^6$ with a pipe $d^7$. At its rear end the pipe $d^7$ is provided with an elbow $d^8$ one branch of which is swiveled in a socket $d^9$ connected by a short pipe $d^{10}$ with another socket $d^{11}$ within which one branch of another elbow $d^{12}$ is swiveled. The other branch of the elbow $d^{12}$ is connected with a pipe $d^{13}$ in which is a normally-closed valve $d^{14}$. The elbows and sockets between the pipes $d^7$ and $d^{13}$ constitute a flexible conduit connecting said pipes which is provided in order to allow the nozzle D to be not only raised and lowered but adjusted laterally in order to fit it to the ferrule. Normally a spring $d^{15}$ connected with the pipe $d^7$ holds said pipe and the nozzle D well above the vise and out of operative position, said parts being shown in Fig. 1 in the positions they occupy when the nozzle is applied to the ferrule by the operator. A spring $d^{16}$ acts through a lever $d^{17}$ to hold the valve $d^{14}$ normally closed said lever being connected by rod $d^{18}$ with a foot-lever $d^{19}$ so that while the nozzle is held against the ferrule by the operator he opens the valve $d^{14}$ by pressure of his foot on lever $d^{19}$ thus admitting air under pressure to the upper end of the ferrule through perforations $d^{20}$ made in the side walls of the extension $d^3$ of the nozzle. The elbows $d^8$ and $d^{12}$ are hollow while the sockets $d^9$ and $d^{11}$ are each made with an interior groove $d^{21}$ registering with a transverse perforation $d^{22}$ with which each swiveled elbow branch is provided so that the conduit between the pipes $d^7$ and $d^{13}$ is always open through the elbows and sockets whatever position the nozzle D occupies. The pipe $d^{13}$ is connected with a tank $d^{22}$ holding the supply of air under pressure.

In using my apparatus, the vise being open, the operator places the ferrule with the roots of the bristles and plug previously inserted therein in position against the jaw $b'$ with the lower edge of the ferrule and plug resting upon the projections $b^{22}$ and $b^{23}$ and with the bristles resting at their lower ends upon the shelf $b^2$. While with one hand he holds the parts of the brush in position against jaw $b'$ he uses the other hand to shove the jaw $b$ against the brush with the projections $b^{22}$ thereof under the ferrule. As the vise is thus closed the beveled extensions $b^{11}$ bunch and compress the bristles, holding them on shelf $b^2$, while the bars $b^3$ clamp the bunch of bristles between them. After the lever $b^{35}$ has been swung on bar $b^{27}$ to set and lock the vise a small quantity of liquid cement is poured into the upper end of the ferrule. The operator then applies the nozzle D to the upper end of the ferrule and while he presses it firmly down against the latter he opens valve $d^{14}$ by foot pressure on lever $d^{19}$. The entrance of the air under pressure into the ferrule C forces the cement down around and between the bristles and around the plug, the fingers $b^{22}$ serving to hold the ferrule against the downward pressure of the nozzle, the fingers $b^{23}$ serving to hold the plug $c'$ from being forced downwardly by the air pressure, and the shelf $b^2$ and extension $b^{11}$ serving to hold the bristles $c$ from being displaced by the air pressure.

My invention is especially useful where air under high pressure is necessary which is the case when rubber cement is used for subsequent vulcanization.

What I claim is:

1. In an apparatus of the character described in combination a vise for gripping the ferrule and bristles; means for supplying air under pressure to said ferrule; means to support the ferrule against said pressure; and means to support the bristles against said pressure.

2. In an apparatus of the character described in combination a vise for gripping the ferrule, plug and bristles; means for supplying air under pressure to said ferrule; means to support the ferrule against said pressure; means to support the bristles against said pressure; and means to support the plug against said pressure.

3. In an apparatus of the character described in combination a vise for holding parts of a brush in assembled position; means for supplying air under pressure to the ferrule while it is held by said vise; one or more fingers on one of the jaws of the vise adapted to penetrate the bunch of bristles below the ferrule and support the plug of the brush against said pressure.

4. In an apparatus of the character described in combination a vise for holding parts of a brush in assembled position; means for supplying air under pressure to the ferrule while it is held by said vise; and one or more projections on one of the jaws to support the ferrule.

5. In an apparatus of the character described in combination a vise for holding parts of a brush in assembled position; a movable nozzle adapted to be applied to one end of the ferrule; means to supply air under pressure to said nozzle; means engaging the end of the ferrule opposite the end thereof engaged by the nozzle for supporting the ferrule against the pressure of the nozzle.

6. In an apparatus of the character described in combination a vise for holding parts of a brush in assembled position; a movable nozzle adapted to be applied to one end of the ferrule; means to apply air under pressure to said nozzle; projections on the jaws of the vise engaging the end of the ferrule opposite the end thereof engaged by the nozzle for supporting the ferrule against the pressure of the nozzle.

7. In an apparatus of the character described a vise adapted to grip both the ferrule and the bristles of a brush; and means to supply air under pressure to the ferrule of the brush.

8. In an apparatus of the character described a vise adapted to yieldingly grip both the ferrule and the bristles of a brush; and means to supply air under pressure to the ferrule of the brush.

9. In an apparatus of the character described a vise adapted to yieldingly grip both the ferrule and the bristles of a brush; means to supply air under pressure to the ferrule of the brush comprising a movable nozzle adapted to be applied to one end of the ferrule; and abutments on the jaws for supporting the ferrule against the pressure of the nozzle.

10. In an apparatus of the character described in combination a vise for holding parts of a brush in assembled relation; means for supplying air under pressure to the ferrule of the brush while it is held by the vise; abutments on the jaws of the vise for supporting the ferrule; and one or more fingers on the vise adapted to penetrate the bristles and support the plug of the brush against the air pressure.

11. In an apparatus of the character described in combination means to hold the ferrule and bristles in assembled relation; means to supply air under pressure to the ferrule of the brush; and a shelf to engage and support the outer ends of the bristles.

12. In an apparatus of the character described a vise adapted to grip both the ferrule and the bristles of a brush; means to supply air under pressure to the ferrule of the brush; and a shelf on one of the jaws of the vise for supporting the bristles.

13. In an apparatus of the character described in combination a vise adapted to grip the ferrule and also to surround and bunch the bristles; and means to supply air under pressure to the ferrule.

14. In an apparatus of the character described in combination a vise adapted to grip the ferrule; a bristle-supporting shelf; and means on the vise to hold the bristles on the shelf.

GEORGE D. PUSHEE.

Witnesses:
M. G. HENNESSY,
G. A. ROCKWELL.